(12) United States Patent
Darut et al.

(10) Patent No.: US 8,049,146 B2
(45) Date of Patent: Nov. 1, 2011

(54) DEVICE AND METHOD FOR WELDING TWO POLYMER PARTS VIA FUSION

(75) Inventors: Alain Darut, Chatou (FR); Dominique Gueugnaut, Paris (FR); Aymeric Lopitaux, Paris (FR)

(73) Assignee: Gaz De France, Paris (FR)

( * ) Notice: Subject to any disclaimer, the term of this patent is extended or adjusted under 35 U.S.C. 154(b) by 441 days.

(21) Appl. No.: 11/749,348

(22) Filed: May 16, 2007

(65) Prior Publication Data
US 2007/0267404 A1    Nov. 22, 2007

(30) Foreign Application Priority Data
May 17, 2006   (FR) ..................................... 06 51790

(51) Int. Cl.
*H05B 3/58*    (2006.01)
(52) U.S. Cl. .......................... 219/528; 219/535; 219/553

(58) Field of Classification Search ................... 219/528, 219/517, 552, 633; 156/158, 273.9
See application file for complete search history.

(56) References Cited

U.S. PATENT DOCUMENTS

| 5,141,580 A | 8/1992 | Dufour et al. |
| 5,500,511 A * | 3/1996 | Hansen et al. ................ 219/633 |
| 2004/0038023 A1 * | 2/2004 | Hartley et al. ................ 428/341 |

FOREIGN PATENT DOCUMENTS

| EP | 0 430 762 | 6/1991 |
| FR | 1.473.009 | 3/1967 |
| JP | 5-138742 | 11/1993 |

* cited by examiner

*Primary Examiner* — Joseph M Pelham
(74) *Attorney, Agent, or Firm* — Leydig, Voit & Mayer, Ltd.

(57) ABSTRACT

The invention relates to a device and a method for welding two polymer parts via fusion using a heater mat knitted from a resistive wire coated with an insulating varnish, the heater mat being given a final shape. The heater mat is resistive wire having a diameter ranging from 0.2 mm to 0.3 mm, and has approximately parallelepiped meshes, the dimensions of which range from $1.5 \times 3$ mm$^2$ to $2.5 \times 4.5$ mm$^2$.

6 Claims, 2 Drawing Sheets

DEVICE AND METHOD FOR WELDING TWO POLYMER PARTS VIA FUSION

FIELD OF THE INVENTION

The invention relates to a device for welding two polymer parts via fusion using a heater mat, as well as a method for welding two polymer parts via fusion using a heater mat.

Thus, the invention relates to the field of setting up a fluid distribution system and that of the replacement of a section or several sections of a pipeline or a conduit of such a system, which are made from a thermofusible material.

BACKGROUND

Distribution systems, in particular as concerns the distribution of city gas or natural gas, are currently already and will increasingly be constructed in large part of conduits formed from tubes or pipes made of polyethylene or polyamide, polybutylene, polypropylene or polyvinyl chloride. Several techniques exist for assembling such pipes. One, for example, consists in heating the end fittings of two pipes arranged opposite one another until the thermofusible material is sufficiently fluid so that, when the two end fittings are closed together under slight pressure, they melt inside one another and form a substantially gas-tight joint having a mechanical strength that is compatible with the use of the conduits being formed.

According to another technique, a heater mat is used, which is made from a resistive wire coated with an insulating varnish. The heater mat in a rectangular shape or in the form of a sheath is then given a final shape in order to be electrically powered by an automaton that is voltage or current intensity-adjustable and resistant to short circuits.

The technique of welding by means of a heater wire or a heater mat appears to be rather promising, and this is the case as concerns both the assembly process and the good performance over time of the joint thus made.

The welding of two polymer parts via fusion obtained by means of a heater mat is based on a moderate and local heating of the area of a conduit that is to be fused, which is made of a thermofusible material, e.g., polyethylene, using an electrical heating element forming a heating resistor. This welding is carried out without any addition of hardfacing material. Supplying the conductors of the heater mat with appropriate electrical power is advantageously, but not exclusively, performed by an automaton, e.g., a welding automaton commonly used for electrofusion welding.

Putting a heater mat or a heater wire into place, when this invention is not used, occurs essentially in four steps, namely:
  injection molding of an impression or preform made of polyethylene or another thermofusible polymer of small thickness, generally of the order of 0.3 mm to 0.8 mm, the impression being intended to receive a resistive wire;
  insertion and holding of the resistive wire inside the impression via winding;
  placement of the connectors at each end of the coiled wire; and
  over-molding of the connector body onto the heater implant formed at the end of the previous step.

Producing the implant in this form is the most delicate and most costly phase, taking into account various factors capable of interfering with the process. Such factors, for example, are a break in the wire during winding, an imperfect connection of the connectors to the wire and the presence of a relatively significant residual stress differential between the impression and the connector body.

Furthermore, experience has shown that the production of the implant suffers from numerous problems in the preparation of the tubes being welded, these problems being linked primarily to the imperfect scraping of the surfaces being assembled.

This is why the thermofusion technique using a heater mat eliminates the conventional coiling of the connectors and, at the interface, results in temperature characteristics superior to those of the winding systems. In addition, fusion using a heater mat can be applied in those cases where polymer parts of various and complex geometries are to be welded together, which would not necessarily be possible with the winding system.

However, as promising and advantageous as fusion welding obtained using a heater mat might appear to be, the fact remains that it has not been possible to resolve certain difficulties inherent in the condition of the parts being welded. These difficulties are primarily due to imperfect preparation (scraping, cleaning, degreasing, . . . ) of the parts being welded, but also to a relatively advanced state of degradation (oxidation, carbonization), or else to defects of a geometric nature or significant roughness.

Other problems result from a sometimes insufficient flexibility of the mat for a given geometry of the parts, from a sometimes difficult fastening of the mat onto the part being welded and from difficulties in holding the mat in the specified position until the parts being welded have fused.

Yet another problem is that, in certain cases, it would be desirable to be able to vary the supply of fusion energy from one location to another on the parts being welded. Theoretically, it would perhaps be possible to use several heater mats, each with its own power supply controlled according to the local requirements of each of the mats. However, such an approach seems very complicated to carry out at a worksite, i.e., outside of the laboratory.

SUMMARY OF THE INVENTION

The purpose of the invention is to make it possible to remedy the above-stated disadvantages.

The purpose of the invention is first achieved by a device for welding two polymer parts via fusion using a heater mat knitted from a resistive wire coated with an insulating varnish, the heater mat being given a final shape in order to be electrically powered by an automaton that is voltage or current intensity-adjustable and resistant to short circuits.

According to the invention, the heater mat is made from a resistive wire having a diameter ranging from 0.2 mm to 0.3 mm, and has approximately parallelepiped meshes, the dimensions of which range from $1.5 \times 3$ mm$^2$ to $2.5 \times 4.5$ mm$^2$.

Owing to the arrangements of the invention, it is possible to use a heater mat which is electrically powerful enough to generate energy levels on the order of 10-100 J/mm$^2$, for common thermofusible materials, and which is at the same time sufficiently flexible from the mechanical and geometric standpoints to accommodate the various geometries of the parts being welded and, as will be explained more fully later, to vary the supply of heat energy from one location to the other of the parts being welded, and to do so with a single heater mat and a single electrical power supply.

In addition, according to another characteristic of the invention, the fastening of a heater mat onto a part being welded by studs made of a thermofusible material enables suitable temporary positioning for both worksite handling and factory production. In the factory, more specifically, this fastening possibility eliminates the need to use specific means for holding the heater mat in place, and therefore results in the elimination of the associated precision robotization for positioning the heater mat. Another advantage of this fastening mode is that it brings a high degree of flexibility to the positioning of the mat, e.g., by fastening all of the meshes or only a certain portion of the meshes, as well as adaptation of the studs to the material of the parts being welded, when the parts are of the same type or when it involves a heterogeneous assembly wherein the mat is fastened onto the most fluid material.

The purpose of the invention is also achieved with a method for welding two polymer parts via fusion using a heater mat knitted from a resistive wire coated with an insulating varnish, the heater mat being given a final shape in order to be electrically powered by an automaton which is voltage or current intensity-adjustable and resistant to short circuits, the mat being made from a resistive wire having a diameter ranging from 0.2 mm to 0.3 mm, and having approximately parallelepiped meshes, the dimensions of which range from $1.5 \times 3$ mm$^2$ to $2.5 \times 4.5$ mm$^2$. The process includes at least the following steps:

giving a heater mat a shape as close as possible to that of at least one of the surfaces to be fused of the parts being welded, fastening the heater mat onto this surface, assembling the two parts being welded, and carrying out the welding operation.

According to one embodiment of this method, the heater mat can be fastened onto one of the parts being welded with studs made of a thermofusible material.

As already suggested in part above, the invention is based on the implementation of a heater mat at the interface of two or more polymer parts being welded, for the purpose of ensuring the welding of these parts via electrofusion. These parts can be made of the same material, e.g., polyethylene, but they can also be made of different materials, e.g., polyethylene and polypropylene.

To facilitate reading of the description of the invention, reference will be made solely to a two-part assembly. However, it is self-evident that this invention also applies to an assembly of three or more parts, e.g., when tapping of a conduit via two other conduits must be carried out and when these two tapping conduits cannot be assembled ahead of time.

For the specific purposes of the invention, the heater mat, which might be made of different materials, is made by knitting a resistive wire coated with an insulating varnish, the melting point of which must be lower than the degradation temperature of the polymer parts being welded. The coating of the wire introduces a self-regulating function for the heating time of the parts being welded, in the sense that, when a predetermined temperature for the welded joint being made is reached, a temperature which ensures interpenetration of the chains of molecules of the contacting surfaces of the parts being assembled, the insulating varnish of the knitted wire melts and results in a short circuit that shuts down the heating by the heater mat.

In addition, the heater mat can be modeled in different shapes, for example, according one plan, in the shape of a cylinder or a flange ring, and thereby can be easily adapted to complex assembly geometries and, where appropriate, in order to concentrate the energy supplied to areas or particular points of the parts, e.g., an angle, a cavity or a machining allowance.

The heater mat can be shaped with different geometries so as to customize it to the type of part being welded. Based on the manner in which it is desired to manage the energy supplied to the welding interface, the knit mesh of the heater mat can assume various dimensions. Furthermore, for a given mesh size, the heater mat can advantageously consist of one or more layers. This advantage can also be used to carry out differentiated heating of various temperature zones of the parts being welded.

To fasten the heater mat and to hold it in place, the mat can be fastened with welding studs made of a melted polymer. According to one variant, and in particular so as to improve the contact between the parts being welded, the heater mat can be advantageously integrated into one of the parts being welded prior to the welding cycle. This integration can be carried out by pre-heating the mat via suitable exterior charging.

Thus, the invention makes it possible at the same time to ensure an improved level of energy per unit area, improved homogeneity of this energy at the welding interface as well as improved control over the temperature with respect to time, and consequently to improve the quality of the weld, even in the presence of residual materials at an improperly prepared interface (imperfect scraping or lack of cleaning, . . . ) or even an interface degraded by oxidation, pyrolysis, or carbonization.

The operation of the invention is based on the controlled, localized heating of at least one interface of two polymer parts, e.g., polyethylene, for a given period of time, so as to cause the welding thereof, at the end of the heating-cooling cycle imposed by an automaton of the welding machine type.

In the case of polyethylene parts, welding results from molecular interpenetration at the interface of the products that have been placed in contact with each other, under the effects of temperature and time imposed by the heater mat.

In comparison with the conventional filament or winding technique, and even in comparison with the technique of a heater mat formed by a crisscross arrangement of a conductor wire, this invention, via improved management and improved distribution of the energy supplied to the material, makes it possible to promote the interdiffusion of the macromolecules within each of the microcells which are delimited approximately by each of the meshes of the beater mat, and to thereby locally increase the interpenetration potential of the materials being welded by activating a more significant proportion of diffusing molecules. Thus, the method of the invention is particularly advantageous in the presence of imperfect surface conditions, which are caused, for example, by craters, significant roughness, waves, etc., or by partially degraded or even polluted materials.

In this case, the interdiffusion barrier consisting of the degraded molecules can be overcome by the deeper surrounding healthy material, without having significantly to increase the welding time, as would be necessary in the case of conventional welding with a filament winding. Furthermore, heating of the interface is ensured by a given resistivity mat which heats up via the Joule effect when the mat is electrically powered by a machine or suitable automaton. The heating and cooling cycles imposed on the assembly by the automaton can be advantageously carried out using electrical parameters such that they make it possible to use all of the welding automatons available on the market.

The optimal welding parameters can be determined by successive approaches, by a mechanical strength test, e.g., via a peeling-type test. For optimal welding quality, even in the presence of initially degraded materials, the energy delivered to the interface must advantageously range between approximately 10 J/mm$^2$ and approximately 100 J/mm$^2$, particularly for polyethylene.

In the example of a method of welding with applied voltage, the heating time for the mat will thus be adapted with respect to its resistance, so as to remain within this energy window.

Below the low energy value per unit area, the quality of the weld is not optimal, which is a consequence of incomplete interdiffusion or interpenetration of the molecules at the interface. Above the high energy value, the quality of the weld tends to decrease when the degradation kinetics of the material surpasses the macromolecular interdiffusion kinetics.

The arrangement of a heater wire or a heater mat in the vicinity of the welding plane makes it possible to supply electrical energy per unit area that is stronger and more homogeneous in comparison with the conventional technique, e.g., via a filament winding in the form of a coil or mat. The stronger and better distributed electrical energy per unit area makes it possible to improve the interdiffusion of the molecules at the interface and thereby to improve the weld quality, even in the case of imperfect surfaces (due to significant roughness, waves, craters, etc.) and/or materials partially degraded by oxidation, carbonization, etc.

For informational purposes, according to laboratory-conducted tests with a close-meshed knit and a wide-meshed knit having the following dimensions:

|  | CM Knit (close-meshed) | WM Knit (wide-meshed) |
| --- | --- | --- |
| Diameter of the wire, 2r | 0.22 mm | 0.28 mm |
| Small side of the "cell," a | 1.5 mm | 3 mm |
| Large side of the "cell," b | 2.5 mm | 4.5 mm |
| Surface area of the "cell," ab | 3.75 mm² | 13.5 mm² | and for polyethylene conduits having a mass density in the solid state of 960 kg/m³, a fusion enthalpy of 180-200 J/g and a fusion range between 120 and 140° C., the following energy range required for fusion of the parts being welded, i.e., the energy per unit area to be supplied in order to obtain good laboratory welding conditions (unaged material and aged material) was determined to be between 10 J/mm² and 100 J/mm².

The energy required to fuse 1 mm³ of material is on the order of 190 (J/g)×$10^{-6}$ (g/mm³) i.e., approximately 0.2 J/mm³.

In the case of laboratory tests, it is considered that the melted thickness on either side of the interface remains less than 1 mm under optimal welding conditions, i.e., a total melted depth of 2 mm (total thickness of the assembly of the two test pieces equal to approximately 4 mm).

Hence, there is a melt volume per cell of the order of 2ab (mm³) to which it is necessary to supply a minimum of 0.2 (J/mm³)2ab (mm³) or 0.4ab (J).

More generally speaking:

$$E_{min} > (\text{fusion enthalpy})(\text{density})(ab)(\text{melt depth}) \quad \text{(condition 1)},$$

a condition linking the minimum energy to be supplied to initiate fusion of the material at the interface to a given depth, the energy required to fuse the material of a given mass density and the surface of the "heater cell."

From the energy relation E=(U²t)/R (where U is the voltage applied during the time period t and R is the total resistance of the knit), and from the resistance relation $$R = (\rho l)/S \text{ (where } \rho, l, \text{ and } S \text{ are the resistivity, length, and cross section of the wire, respectively)},$$

it is concluded that E=(U² t)S/(ρ1), hence, the energy per unit area:

$$E_S(U^2 t)[\pi r^2]/(\rho 1)AB$$

(hence, AB is the total heated surface area).

Reduced to the size of the cell, the energy per unit area becomes:

$$E_S = (U^2 t)[\pi r^2]/(\rho[2a+2b])([a+2r]/[b+2r]),$$

hence:

$$10 \text{ J/mm}^2 < (U^2 t)[\pi r^2]/(\rho[2a+2b])([a+2r]/[b+2r]) < 100 \text{ J/m}^2 \quad \text{(condition 2)},$$

a condition linking the size of the "heater cell" to the parameters of the wire as well as to the operating conditions.

The invention also relates to the following characteristics considered separately or in any technically possible combination:

- the resistive wire of the heater mat is coated with a varnish having a fusion point lower than the degradation temperature of the polymer parts being welded;
- the heater mat is an elongated object;
- the heater mat is a sheath;
- the heater mat is a strip;
- the heater mat has an irregular mesh pitch;
- localized super-concentration of the welding energy is obtained as needed by folding the mat over on itself;
- localized super-concentration of the welding energy is obtained by giving the heater mat an irregular mesh pitch.

DESCRIPTION OF DRAWING FIGURES

Other characteristics and advantages of the invention will become apparent from the following description of an embodiment of a heater mat of a device of the invention and its application to two conduits to be welded. This description is made with reference to the drawings in which.

DETAILED DESCRIPTION

Figure 1:
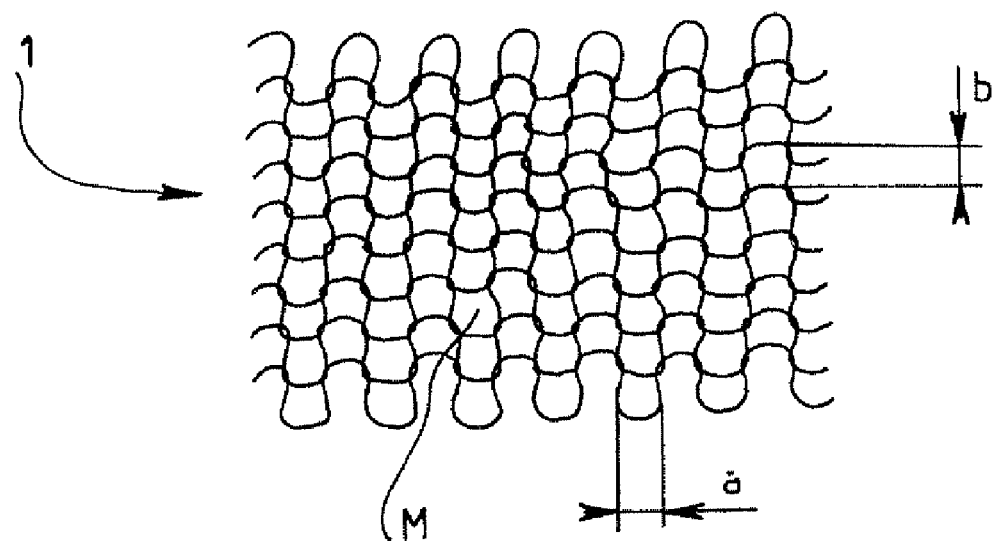
FIG. 1 shows a portion of a heater mat of a device of the invention.

FIG. 1 shows a portion of a knitted heater mat 1 used for the device of the invention. The mat 1 is obtained by knitting a resistive wire having a 2r diameter, which is coated with an insulating varnish, and has approximately parallelepiped meshes M with dimensions a and b, where a is the dimension of the small side of a cell or mesh M, b is the dimension of the large side of the mesh M, and the product ab is the surface area of a mesh, which corresponds approximately to a heater cell of the heater mat 1. According to the invention, the small side of a mesh M has dimensions ranging from 1.5-2.5 mm and the large side b has dimensions ranging from 3-4.5 mm.

The heater mat 1 is made either in the form of a flat body, or in the form of a sheath. In addition, knitting is carried out so as to give the finished heater mat a certain degree of dimensional flexibility in the lengthwise direction of the mat and a slight degree of flexibility in the widthwise direction.

Figure 2:
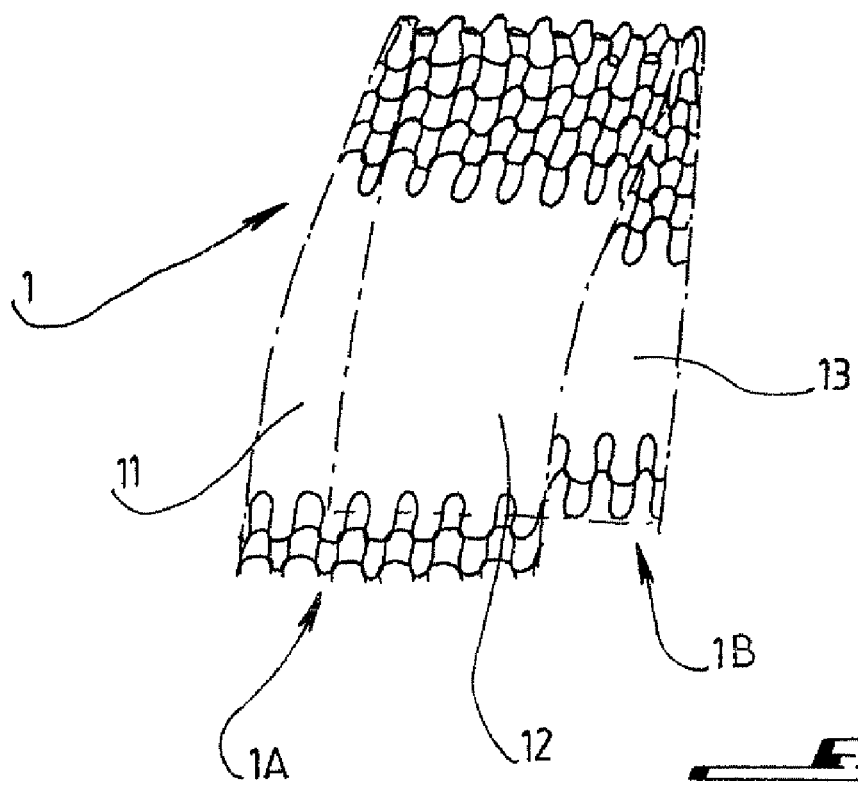
FIG. 2 shows the mat of FIG. 1 in folded-over position.

FIG. 2 shows a heater mat 1 made in the form of a sheath and therefore capable of being threaded over a cylindrical part to be welded, or flattened and used as a strip-like heater mat. In the latter case, the heater mat will thus have two layers of superimposed meshes. In order not to overload FIG. 2, the mat 1 is shown as a single strip, i.e., only the layer oriented towards the reader of the drawings is seen.

FIG. 2 more specifically shows a heater mat 1 in the form of a sheath, flattened and folded over once in order to increase locally the number of layers of meshes and thereby to obtain a localized super-concentration of the welding energy.

As a matter of fact, as shown in FIG. 2, the heater mat 1 is folded over once and the two portions 1A, 1B of the mat thus obtained are arranged so as to be partially staggered in relation to each other and in regard to the number of layers of meshes and the energy capacity to be supplied, so as to obtain a first single mat portion 11, a double mat portion 12 and a second single mat portion 13. Depending on the manner in which the two portions 1A, 1B of the mat 1 are staggered, the double mat portion 12 is relatively wide and relatively long.

Figure 3:
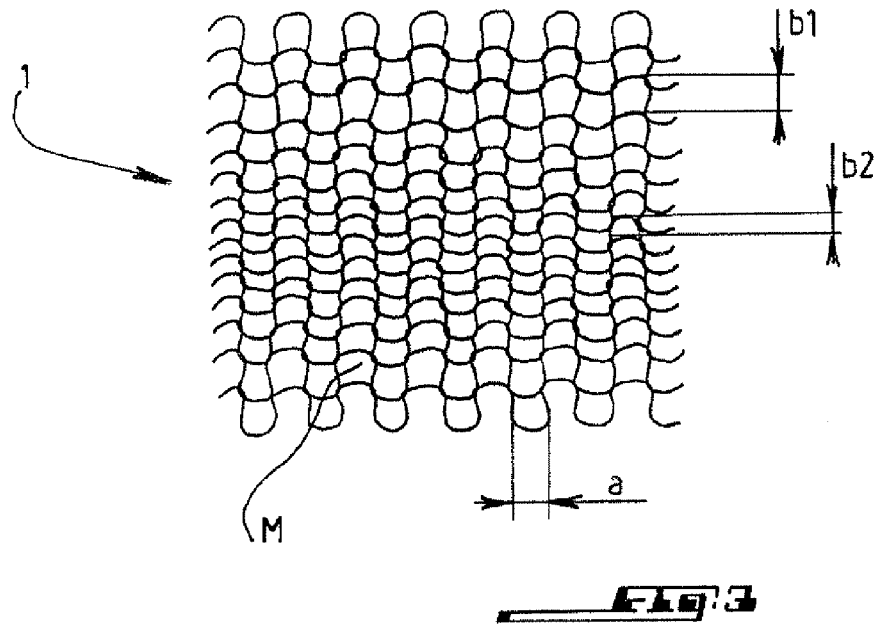
FIG. 3 shows a variant of the heater mat of FIG. 1.

FIG. 3 shows a portion of a heater mat 1 of a device of the invention, which differs from that of FIG. 1 in that it has an uneven distribution of the meshes on the surface in question. This uneven distribution of the meshes is obtained manually when the heater mat is positioned on the surface to be melted, by concentrating the meshes over an area requiring a super-concentration of energy, and by spacing out the meshes in the other areas as much as possible.

Because of the knitting style, the meshes of the heater mat 1 are more movable in relation to one another, in one direction than the other. In FIGS. 1-3, the meshes M are more movable in the vertical direction than in the horizontal direction. Thus, when it is a matter of arranging an area requiring a super-concentration of energy, the mat 1 is compressed in the vertical direction and thereby 1 reduces the large side b1 (which corresponds to the side b of FIG. 1) to a small side b2.

Figure 4:
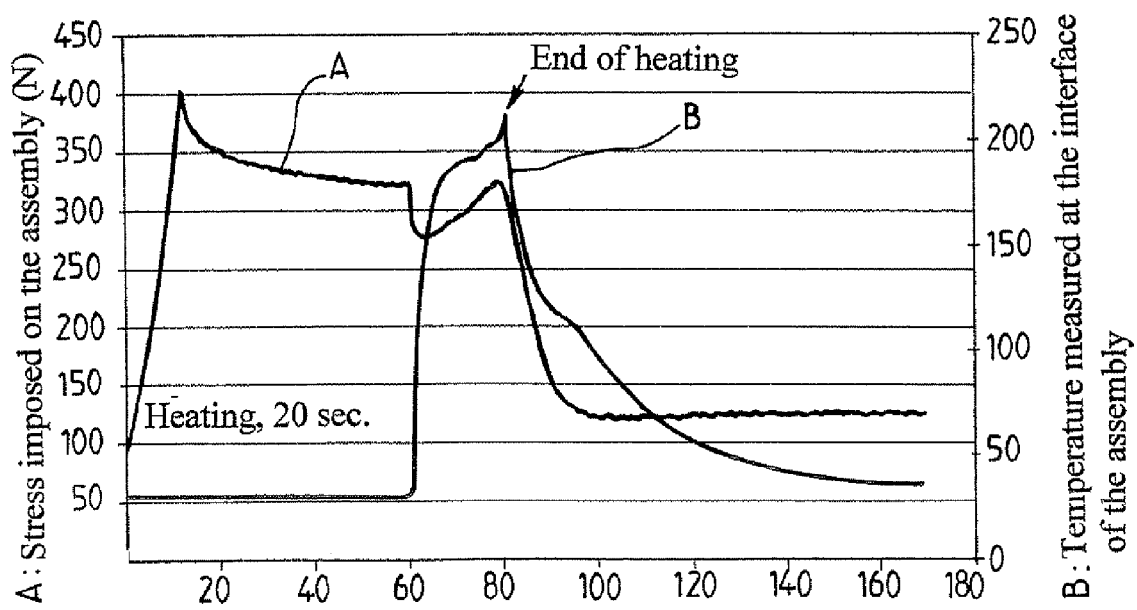
FIG. 4 shows a diagram of a welding cycle with measurement of the temperature at the interface and the force imposed during welding.

For illustrative purposes, FIG. 4 shows a diagram which, for a welding cycle, represents the mechanical stress imposed on two parts being welded (curve A) and the temperature measured at the interface of the assembly (curve B). The welding cycle includes a heating phase lasting approximately 20 sec followed by a relatively rapid cooldown for approximately 10 see and a slower cooldown for approximately 80 sec. This heating cycle is staggered in relation to the cycle for applying the stress imposed on the assembly. As shown in FIG. 4, the heating period begins only approximately 60 sec after the start of a cycles this cycle start-up is marked by a preloading of the assembly, by applying the stress, which increases to the maximum over a period of approximately 10 sec, followed by a certain pause for 50 sec, the period during which the heating period begins. This heating is accompanied by an additional pause and then a restart of the stress applied to the assembly, until the end of the heating period. During cooling of the welded parts, the stress imposed on the assembly decreases rapidly in order to be then maintained at a low level (of the order of 100 N).

The invention claimed is:

1. A device for welding two polymer parts via fusion, the device comprising:
   a heater mat knitted from a continuous resistive wire having first and second ends and coated with an insulating varnish, wherein
   the heater mat is flexible,
   the heater mat has a mesh of cells ranging in size from $1.5 \times 3$ mm$^2$ to $2.5 \times 4.5$ mm$^2$,
   the resistive wire has a diameter ranging from 0.2 mm to less than 0.3 mm,
   the varnish melts at a predetermined temperature, short circuiting the resistive wire so that heating of the heater mat, in response to an electrical current through the resistive wire from the first end to the second end, stops, and
   the heater mat is folded at least partially on itself and has a first region with a relatively high density of the cells and a second region with a relatively low density of the cells, the first region reaching a higher temperature than the second region in response to the electrical current flow through the resistive wire from the first end to the second end.

2. The device according to claim 1, wherein the heater mat is an elongated object.

3. The device according to claim 2, wherein the heater mat is a sheath.

4. The device according to claim 2, wherein the heater mat is a strip.

5. A method for welding two polymer parts via fusion of the two polymer parts at an interface of the two polymer parts, the method comprising:
   knitting a heater mat from a continuous resistive wire having first and second ends and coated with an insulating varnish so that the heater mat comprises a mesh of cells, the resistive wire having a diameter ranging from 0.2 mm to less than 0.3 mm and the varnish having a predetermined fusion point;
   manipulating the cells of the heater mat to provide a first region of the heater mat with a relatively high density of the cells and a second region of the heater mat with a relatively low density of the cells;
   shaping the heater mat into a shape as close as possible to the shape of at least one of the polymer parts to be welded;
   fastening the heater mat with studs of a thermofusible material onto the polymer parts to be fused to hold the heater mat in place, with the first region located proximate a part of the polymer parts to be heated to a higher temperature than a part of the polymer parts which is adjacent the second region of the heater mat;
   assembling the two polymer parts to be welded with the heater mat held in place by the studs; and
   passing an electrical current through the resistive wire from the first end to the second end, thereby producing a higher temperature in the first region of the heater mat than in the second region of the heater mat and welding the two polymer parts together, wherein manipulating the heater mat comprises folding a first part of the heater mat onto a second part of the heater mat to produce the first region so that, during the welding, a localized concentration of welding energy and relatively increased temperature are achieved at the first region of the mat relative to the second region of the mat.

6. The method according to claim 5, including, in passing an electrical current through the resistive wire from the first end to the second end, supplying a welding energy density to the heater mat in a range from 10 J/mm$^2$ to 100 J/mm$^2$.

* * * * *